Patented Jan. 25, 1927.

1,615,208

UNITED STATES PATENT OFFICE.

KURT ANDRICH, OF FRANKFORT-ON-THE-MAIN, GERMANY, ASSIGNOR TO ROESSLER & HASSLACHER CHEMICAL COMPANY, OF NEW YORK, N. Y., A CORPORATION OF NEW YORK.

PROCESS FOR THE PREPARATION OF ALKALI METAL CYANIDE SOLUTIONS.

No Drawing. Application filed December 22, 1925, Serial No. 77,128, and in Germany December 23, 1924.

This invention relates to the preparation of concentrated alkali metal cyanide solutions by the absorption of hydrocyanic acid gas.

It is known that when hydrocyanic acid gas is passed into a solution, mixture of lime and an alkali metal sulphate an alkali metal cyanide solution will be formed and calcium sulphate will be precipitated. All attempts to utilize this fact for the production of concentrated solutions met with an unexpected difficulty so that the process is of no commercial value. The difficulty encountered was the formation of an exceedingly voluminous precipitate. This precipitate is so voluminous and the thickening of the solution caused thereby so great that effective stirring became impossible and the absorption of the hydrocyanic acid which, further, was passed into the solution was incomplete.

The cause of this troublesome precipitate, is the formation of a double salt of an alkali metal sulphate and calcium sulphate, $Na_2SO_4 \cdot CaSO_4$, which as stated above is exceedingly voluminous. For example, if I have present at the start a solution of sodium sulphate of such concentration as will result in a 25% solution of sodium cyanide and a corresponding amount or excess of lime and I pass hydrocyanic acid gas into the solution a good result is obtained up to a certain concentration of sodium cyanide. As soon, however, as this critical concentration is exceeded, the formation of the troublesome double salt becomes noticeable.

I have now found conditions under which the reaction can be carried out without meeting with the difficulty mentioned. When the critical concentration of alkali metal cyanide is reached or more advantageously still, just before it is attained I keep the concentration of the alkali metal sulphate so low that the formation of the double salt is either avoided altogether or that troublesome quantities thereof are not formed. The critical concentration of the alkali metal cyanide depends on various conditions: chiefly on the amount of alkali metal sulphate present, furthermore on the temperature and so forth.

I have found for example that I can work safely (at ordinary temperature) in the presence of the total quantity of lime which is required by the final sodium cyanide concentration desired, when the total sodium sulphate at the start, dissolved as well as suspended, amounts to not more than 26–28%. These 26–28% sodium sulphate correspond to 18 to 20% sodium cyanide after the reaction with hydrocyanic acid is complete. At no time during the conversion into sodium cyanide the influence of the sodium cyanide concentration rising gradually up to 20% is so great upon the sodium sulphate which remains still uncovered, that the double sodium-calcium sulphate is salted out either by the sodium cyanide or by the sodium sulphate. If however the sodium sulphate concentration at the beginning of the batch exceeds a proportion of 28 parts of sodium sulphate in 100 parts of water, the sodium cyanide concentrations very soon become too high in relation to the sodium sulphate solution still unchanged. The formation and separation of the voluminous double sulphate begins fairly soon and at sodium cyanide concentrations which are considerably below 18–20%.

The operation, therefore, is carried into effect with advantage in such a way that the batch is started with a solution-mixture which contains the total lime and about 28 parts of sodium sulphate in 100 parts of water. The hydrocyanic acid gas is now passed through this mixture resulting in the formation of sodium cyanide and the separation of gypsum. As soon as the total quantity of sodium sulphate is converted into sodium cyanide the process can be carried on by adding fresh amounts of sodium sulphate either continuously or intermittently in small portions. In adding the sodium sulphate care has to be taken, that its conversion into sodium cyanide proceeds equally quickly as the introduction of hydrocyanic acid or that it is added in such quantities only as will not lead to too high a concentration and consequent formation of the insoluble double sulphate.

Fresh quantities of sodium sulphate may also be added even before the total sodium sulphate has been converted into sodium cyanide. But in this case it is difficult to avoid the dangerous sodium sulphate concentrations and the process has to be watched far more carefully as when working according to the first described method.

The best, easiest and safest way, however, is to add the fresh sodium sulphate after the first amount has been completely utilized. In this case I proceed as follows:

After the sodium sulphate which has been primarily applied, has been completely utilized, the introduction of the hydrocyanic acid gas is continued regardless of the absence of any sodium sulphate. The hydrocyanic acid is absorbed by the lime which is present in great excess and forms with it calcium cyanide. After a certain quantity of this cyanide of calcium has been formed, sodium sulphate is added which reacts immediately with the calcium cyanide previously formed with formation of sodium cyanide and simultaneous deposition of calcium sulphate. The quantities of sodium sulphate to be added when working according to this method are advantageously kept so small that there remains always an excess of calcium cyanide not reacted upon by the sodium sulphate. In this way the presence of free sodium sulphate capable of forming the double salt with calcium sulphate is avoided altogether, when the process proceeds. After the addition of these amounts of sodium sulphate again calcium cyanide is formed by the continued introduction of the hydrocyanic acid gas; this is again converted into sodium cyanide after a certain time by the addition of a fresh measured quantity of sodium sulphate subject to the same precautions. At the end of the process the current of hydrocyanic acid gas is stopped and the calcium cyanide still present is converted into sodium cyanide by a corresponding amount of sodium sulphate.

When working according to my new method I obtain easily solutions of very high sodium cyanide concentration, for instance solutions of 40–45% without encountering any of the difficulties previously described. The amount of lime required to react with the sulphuric acid of the sodium sulphate to be added, can all be introduced at the start of a particular batch or it may be added in small amounts as the reaction proceeds, but care has to be taken that it is always present in excess in relation to the sodium sulphate.

It could not be foreseen that the reaction would proceed smoothly and without any trouble as it was known that calcium cyanide very easily decomposes. There was therefore the danger that this decomposition would cause considerable loss of hydrocyanic acid. I found to my surprise, however, that this did not happen as the sodium cyanide being present in higher concentration apparently protects the calcium cyanide against decomposition.

My invention shall be described by an example taken from actual practical work, where the wash waters of a previous batch are taken to start a new batch.

*Example I.*—220 liters of dilute solutions from previous washings containing 11% NaCN and 10% $Na_2SO_4$ are mixed with 100 kilogrammes of lime (with 73% $Ca(OH)_2$) and 30 kgrms. of sodium sulphate. Through this solution-mixture hydrocyanic acid gas is bubbled with stirring. After about 20 minutes the whole of the sodium sulphate present is already completely converted. The introduction of the gas into the mixture is continued without any more sodium sulphate being added in the meantime. After 15 more minutes have passed 30 kgrms. of sodium sulphate are added in order to convert the calcium cyanide previously formed. When this has been done 25 kgrms. of sodium sulphate are introduced at the end of every 20 minutes until another 75 kgrms. of sodium sulphate are applied bringing the total of sodium sulphate used up to 135 kgrms. The temperature of the mixture, which was 19° centigrade at the beginning rises during the course of the reaction to about 40° C.; it is maintained there but is allowed to fall usually towards the end of the process to about 37° C. At the end of the hydrocyanic acid addition the stirring is continued for a short time and then the small excess of calcium cyanide is converted into sodium cyanide by the addition of the corresponding quantity of sodium sulphate. The solution is subsequently separated by filtration from the calcium sulphate precipitate. The filtrate contains 36% sodium cyanide. The precipitate is freed from any sodium cyanide by washing and the washings are utilized for a new batch.

Furthermore I have found that the formation of the double sulphate of calcium and an alkali metal is favored by higher temperatures but that it is not stable at temperatures which do not exceed 15° centigrade. The critical temperature depends to a certain extent upon the general working conditions, for instance upon the sodium sulphate and sodium cyanide concentrations. By operation at a temperature not exceeding 12–15° centigrade the deposition or the formation of double salt can be avoided. In this way also solutions of high sodium cyanide concentration for example 40–45% can be obtained, without resorting to the methods explained above. When operating at lower temperatures therefore, it is possible to start with solutions which contain much greater amounts of sodium sulphate in suspension and solution. They may even contain the total of the sodium sulphate required for the reaction in addition to the total of the lime necessary for obtaining the desired final sodium cyanide concentration.

When using this method it has been found advantageous to raise the temperature of the batch at the end of the absorption process in order to bring any precipitated sodium cyanide back into solution.

Thus I can adapt my process to any situation by employing a combination of the above methods of avoiding the formation of the double alkali-calcium salt or employing them separately.

As example of the second method the following is given:

*Example II.*—32,7 parts by weight of 90% calcium hydroxide and 52,3 parts by weight of 99% sodium sulphate are added to 100 parts by weight of a solution containing 194 grms. of sodium cyanide per liter. (This solution coming from a dilute second and third wash water). 18,9 parts by weight of hydrocyanic acid gas are now bubbled in with stirring throughout a period of one hour. The rate of gas addition being such that the temperature of the mixture does not rise above 15° C. during the first 45 minutes; in the last 15 minutes the temperature is forced up to about 40° C. The solution obtained on filtering contains about 413 grams of sodium cyanide per liter.

What I claim is:

1. Process for the preparation of a concentrated solution of an alkali metal cyanide which consists in reacting hydrocyanic acid with an aqueous mixture of alkali metal sulphate and calcium hydroxide the alkali metal sulphate being present in an amount insufficient to form a double sulphate with the calcium sulphate formed in the reaction.

2. Process for the preparation of a concentrated solution of an alkali metal cyanide which consists in the introduction of hydrocyanic acid in an aqueous mixture of lime and alkali metal sulphate, adding fresh quantities of alkali metal sulphate when or before such alkali metal cyanide concentrations are attained as cause the precipitation of a double salt of alkali metal sulphate and calcium sulphate, the addition taking place under conditions which prevent the formation of alkali metal sulphate concentrations leading to the separation of the double salt.

3. Process for the preparation of a concentrated solution of an alkali metal cyanide which consists in reacting hydrocyanic acid with an aqueous mixture of calcium hydroxide and alkali metal sulphate the latter primarily being insufficient to carry through the whole reaction, further amounts then being added before, when or after the previous amounts have been converted into sodium cyanide and regulating its quantity in such a way that by the addition such concentrations in the solution of alkali metal sulphate are avoided as will cause, corresponding to the increasing alkali metal cyanide concentration, the separation of double sulphate of lime and alkali metal.

4. Process for the preparation of concentrated solution of an alkali metal cyanide which consists in the introduction of hydrocyanic acid in an aqueous mixture of lime and alkali metal sulphate, adding fresh alkali metal sulphate gradually and in such quantities that the sulphate added is utilized for the formation of cyanide before it has the possibility of forming a double sulphate with the gypsum formed in the reaction, the addition of the alkali metal sulphate taking place when or before such alkali metal cyanide concentrations are attained as give rise to the separation of double salts of alkali metal sulphate and calcium sulphate.

5. Process for the preparation of concentrated solution of an alkali metal cyanide which consists in the introduction of hydrocyanic acid in an aqueous mixture of lime and alkali metal sulphate, adding further alkali metal sulphate when or before such alkali metal cyanide concentrations are attained as cause the precipitation of the double salts of alkali metal sulphate and calcium sulphate, the further addition of the alkali metal sulphate taking place only after a certain amount of calcium cyanide has been formed.

6. Process for the preparation of a concentrated solution of an alkali metal cyanide which consists in the introduction of hydrocyanic acid in an aqueous mixture of lime and alkali metal sulphate, adding further alkali metal sulphate when or before such alkali metal cyanide concentrations are attained as cause the precipitation of the double salts of alkali metal sulphate and calcium sulphate, the further addition of the alkali metal sulphate taking place only after a certain amount of calcium cyanide has been formed and the quantity added being kept below that which is necessary for the complete conversion into the alkali metal cyanide of the total calcium cyanide present.

7. Process for the preparation of a concentrated solution of an alkali metal cyanide which consists in the introduction of hydrocyanic acid in an aqueous mixture of lime and alkali metal sulphate, adding further alkali metal sulphate when or before such alkali metal cyanide concentrations are attained as cause the precipitation of the double salts of alkali metal sulphate and calcium sulphate, the further quantities of alkali metal sulphate being introduced in the form of several portions to be added after certain intervals in order to convert into alkali metal cyanide the calcium cyanide which in the meantime has been formed.

8. Process for the preparation of a concentrated solution of an alkali metal cyanide which consists in reacting hydrocyanic acid with an aqueous mixture of calcium hydroxide and an alkali metal sulphate applying the alkali metal sulphate primarily in such a quantity only that the alkali metal cyanide formed therefrom does not cause separation of calcium-alkali metal double sulphate, and introducing hydrocyanic acid into the solution, until the alkali metal sulphate has been substantially utilized whereupon further amounts of alkali metal sulphate are added with the provision that such alkali metal sulphate concentrations are avoided as give rise to the formation and separation of the double salt.

9. Process for the preparation of a concentrated solution of an alkali metal cyanide which consists in reacting hydrocyanic acid with an aqueous mixture of calcium hydroxide and an alkali metal sulphate, passing the hydrocyanic acid into a solution-mixture of lime and alkali metal sulphate which does not contain more alkali metal sulphate than is necessary for the formation of a 20% alkali metal cyanide solution, until the alkali metal sulphate has been substantially used up, and adding subsequently further amounts of alkali metal sulphate with the provision that such alkali metal sulphate concentrations are avoided as give rise to the formation and separation of the double sulphate.

10. Process for the preparation of a concentrated solution of sodium cyanide which consists in reacting hydrocyanic acid with an aqueous mixture of sodium sulphate and lime, the sodium sulphate being present in an amount insufficient to form a double sulphate with the calcium sulphate formed in the reaction taking care that the lime present is always in excess over the sodium sulphate.

11. Process for the preparation of a concentrated solution of an alkali metal cyanide which consists in reacting hydrocyanic acid with an aqueous mixture of alkali metal sulphate and calcium hydroxide at a temperature below that at which the formation and separation of the double calcium alkali metal sulphate becomes possible.

12. Process for the preparation of a concentrated solution of an alkali metal cyanide which consists in reacting hydrocyanic acid with an aqueous mixture of alkali metal sulphate and calcium hydroxide at a temperature of about 15° centigrade.

Signed at Frankfort-on-the-Main, Germany, this 2d day of December A. D., 1925.

KURT ANDRICH.